(12) United States Patent
Saint Clair

(10) Patent No.: US 7,860,401 B2
(45) Date of Patent: Dec. 28, 2010

(54) QUADRATURE AMPLITUDE MODULATION-MODULATED RETRO-REFLECTOR

(75) Inventor: Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 572 days.

(21) Appl. No.: 11/955,811

(22) Filed: Dec. 13, 2007

(65) Prior Publication Data

US 2009/0153940 A1 Jun. 18, 2009

(51) Int. Cl.
*H04B 10/22* (2006.01)
(52) U.S. Cl. .......................... 398/170; 398/169; 398/186
(58) Field of Classification Search ......... 398/169–170, 398/186, 189–191
See application file for complete search history.

(56) References Cited

U.S. PATENT DOCUMENTS 7,711,441 B2 * 5/2010 Tillotson ...................... 700/59

2008/0247764 A1 * 10/2008 Lewin et al. ................. 398/154

* cited by examiner

*Primary Examiner*—Leslie Pascal
(74) *Attorney, Agent, or Firm*—Yee & Associates, P.C.; John A. LePore

(57) ABSTRACT

A method for point-to-point communication over an optical channel is provided. An optical beam is received at a first corner cube modulated retro-reflector. Simultaneously, the optical beam is received at a second corner cube modulated retro-reflector. The first and second corner cube modulated retro-reflectors are adjacent to each other, are co-boresighted, and have an aggregate diameter that is smaller than the far-field Instantaneous Field of View of a receiver. The optical beam is modified by the first corner cube modulated retro-reflector by adding a first modulation to the optical beam, forming a first modulated optical beam. Simultaneously, the optical beam is modified by the second corner cube modulated retro-reflector by adding a second modulation to the optical beam, forming a second modulated optical beam. The first modulated optical beam and the second modulated optical beam combine to form a modified optical wavefront, which is reflected to a sender.

21 Claims, 6 Drawing Sheets

QUADRATURE AMPLITUDE MODULATION-MODULATED RETRO-REFLECTOR

BACKGROUND INFORMATION

1. Field

The present disclosure relates generally to free space optical communications. More specifically, the present disclosure provides a method and system for point-to-point communication over an optical channel.

2. Background

Modulated optical retro-reflectors (MRRs) are emerging as useful communications components for small military vehicles. A retro-reflector is a device that reflects incident light beam back along a vector that is parallel to but opposite in direction from the angle of incidence. The bandwidths needed to support payload sensors of choice exceed one (1) gigabyte per second (Gbps), while emerging approaches have shown performance at 100 kbps to 10 Mbps. The primary problem with achieving the 1 Gbps performance is the bandwidth limitations of the multiple quantum well (MQW) semiconductor devices used in the modulated optical retro-reflectors. High sensitivity requires large area multiple quantum well devices, which automatically means high capacitance, and thus low frequency.

A current solution to the problem of increasing bandwidth has been to use arrays of smaller multiple quantum well modulators. Some of these arrays have shown the ability to increase bandwidth from 100 kbps up to the 10's to 100 Mbps. However, while improvements have been made, room for improvement exists, as current solutions still do not provide the bandwidths needed for the application.

Accordingly, there is a need for a method and apparatus for addressing bandwidth needs, which over come the problems discussed above.

SUMMARY

An advantageous embodiment of the present disclosure provides a system for point-to-point communication over an optical channel. The system comprises a first modulated optical retro-reflector, a second modulated optical retro-reflector, and a quadrature amplitude modulation (QAM) modulator unit. The first and second modulated optical retro-reflectors are adjacent to each other and co-boresighted. The aggregate angular diameter of the first and second modulated optical retro-reflectors is contained within an angular Field of View (FOV) of an optic of an interrogator receiver, and an aggregate linear diameter of the first and second modulated optical retro-reflectors is smaller than a spot size of an interrogating optical beam at the first and second modulated optical retro-reflectors. The quadrature amplitude modulation (QAM) modulator unit is coupled to both the first and second modulated optical retro-reflectors. The quadrature amplitude modulation (QAM) modulator unit drives an amount of modulation generated by a first modulating structure in the first modulated optical retro-reflector and a second modulating structure in the second modulated optical retro-reflector. The amount of modulation in the first modulated optical retro-reflector corresponds to an I value of an I symbol of a quadrature amplitude modulation (QAM) symbol for a piece of data. The amount of modulation in the second modulated optical retro-reflector corresponds to a Q value of a Q symbol of the quadrature amplitude modulation (QAM) symbol for the piece of data.

In another advantageous embodiment, a method for point-to-point communication over an optical channel is provided. An interrogating optical beam is received at a first modulated optical retro-reflector. Simultaneously, the interrogating optical beam is received at a second modulated optical retro-reflector. The first and second modulated optical retro-reflectors are adjacent to each other and co-boresighted. The aggregate angular diameter of the first and second modulated optical retro-reflectors is contained within an angular Field of View (FOV) of an optic of an interrogator receiver, and an aggregate linear diameter of the first and second modulated optical retro-reflectors is smaller than a spot size of an interrogating optical beam at the first and second modulated optical retro-reflectors. The interrogating optical beam is modified by adding a first modulation to the interrogating optical beam, forming a first modulated optical beam. The first modulation is added to the interrogating optical beam by the first modulated optical retro-reflector. The first modulation corresponds to an I value of an I symbol of a quadrature amplitude modulation (QAM) symbol for a piece of data. Simultaneously, the interrogating optical beam is modified by adding a second modulation to the interrogating optical beam, forming a second modulated optical beam. The second modulation is added to the interrogating optical beam by the second modulated optical retro-reflector. The second modulation corresponds to a Q value of a Q symbol of the quadrature amplitude modulation (QAM) symbol for the piece of data. The first modulated optical beam and the second modulated optical beam are reflected to the interrogator receiver. The first modulated optical beam and the second modulated optical beam combine to form a modified optical wavefront.

In another advantageous embodiment, a computer program product contains a program code for point-to-point communication over an optical channel. The program code receives an interrogating optical beam at a first modulated optical retro-reflector. The program code receives, simultaneously, the interrogating optical beam at a second modulated optical retro-reflector, wherein the first and second modulated optical retro-reflectors are adjacent to each other and co-boresighted and wherein an aggregate angular diameter of the first and second modulated optical retro-reflectors is contained within an angular Field of View (FOV) of an optic of an interrogator receiver, and wherein an aggregate linear diameter of the first and second modulated optical retro-reflectors is smaller than a spot size of an interrogating optical beam at the first and second modulated optical retro-reflectors. The program code modifies the interrogating optical beam by adding a first modulation to the interrogating optical beam, forming a first modulated optical beam, wherein the first modulation is added to the interrogating optical beam by the first modulated optical retro-reflector, and wherein the first modulation corresponds to an I value of an I symbol of a quadrature amplitude modulation (QAM) symbol for a piece of data. The program code modifies, simultaneously, the interrogating optical beam by adding a second modulation to the interrogating optical beam forming a second modulated optical beam, wherein the second modulation is added to the interrogating optical beam by the second modulated optical retro-reflector, and wherein the second modulation corresponds to a Q value of a Q symbol of the quadrature amplitude modulation (QAM) symbol for the piece of data. The program code reflects the first modulated optical beam and the second modulated optical beam to a sender, wherein the first modulated optical beam and the second modulated optical beam combine to form a modified optical wavefront.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
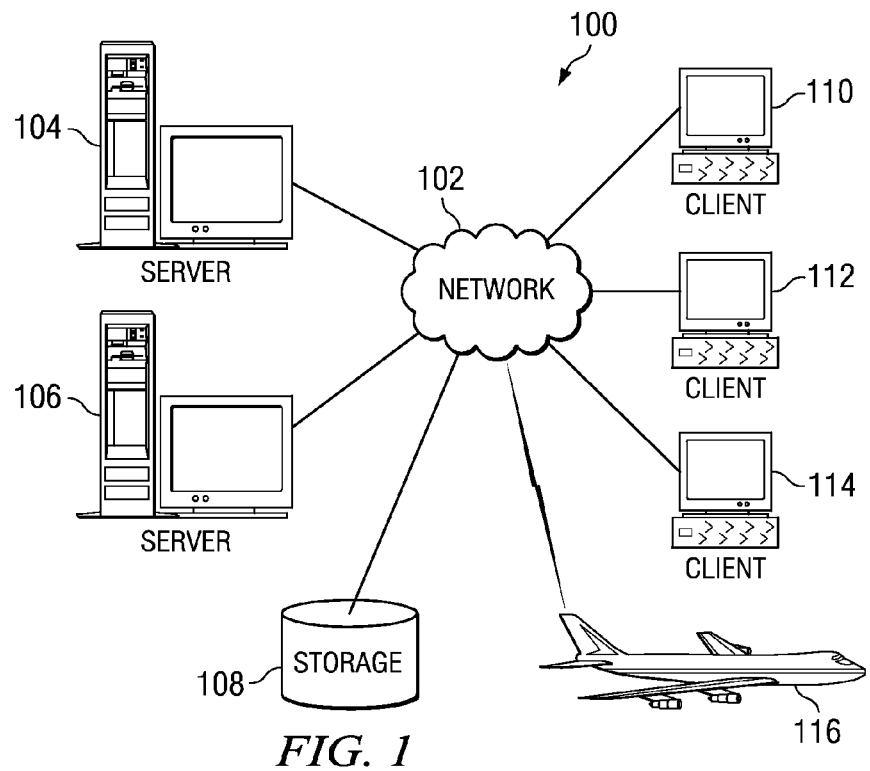
FIG. 1 is a pictorial representation of a network of data processing systems in which the advantageous embodiments of the present disclosure may be implemented.
Figure 2:
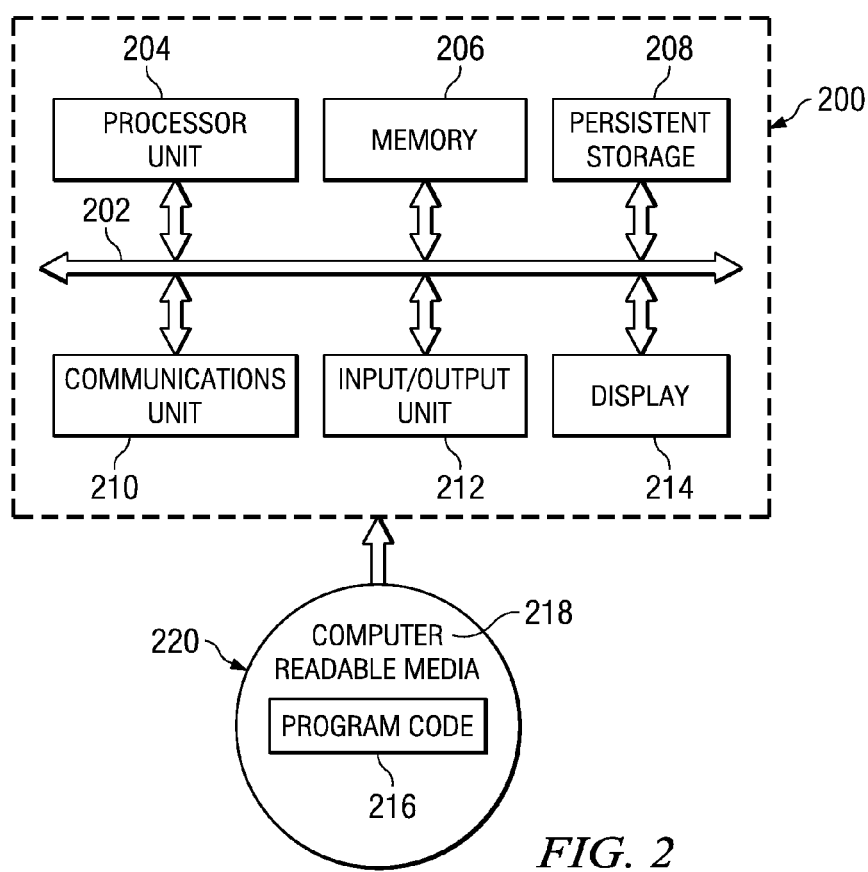
FIG. 2 is a block diagram of a data processing system is depicted in accordance with an advantageous embodiment.

With reference now to the figures and in particular with reference to FIGS. 1-2, exemplary diagrams of data processing environments are provided in which the advantageous embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present disclosure may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables. In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers that receive and analyze data transmitted from aircraft 116 through system 300 of FIG. 3, or they may in turn be computers used to control communication settings, such as quadrature amplitude modulation (QAM) modulator 302 in FIG. 3. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a block diagram of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
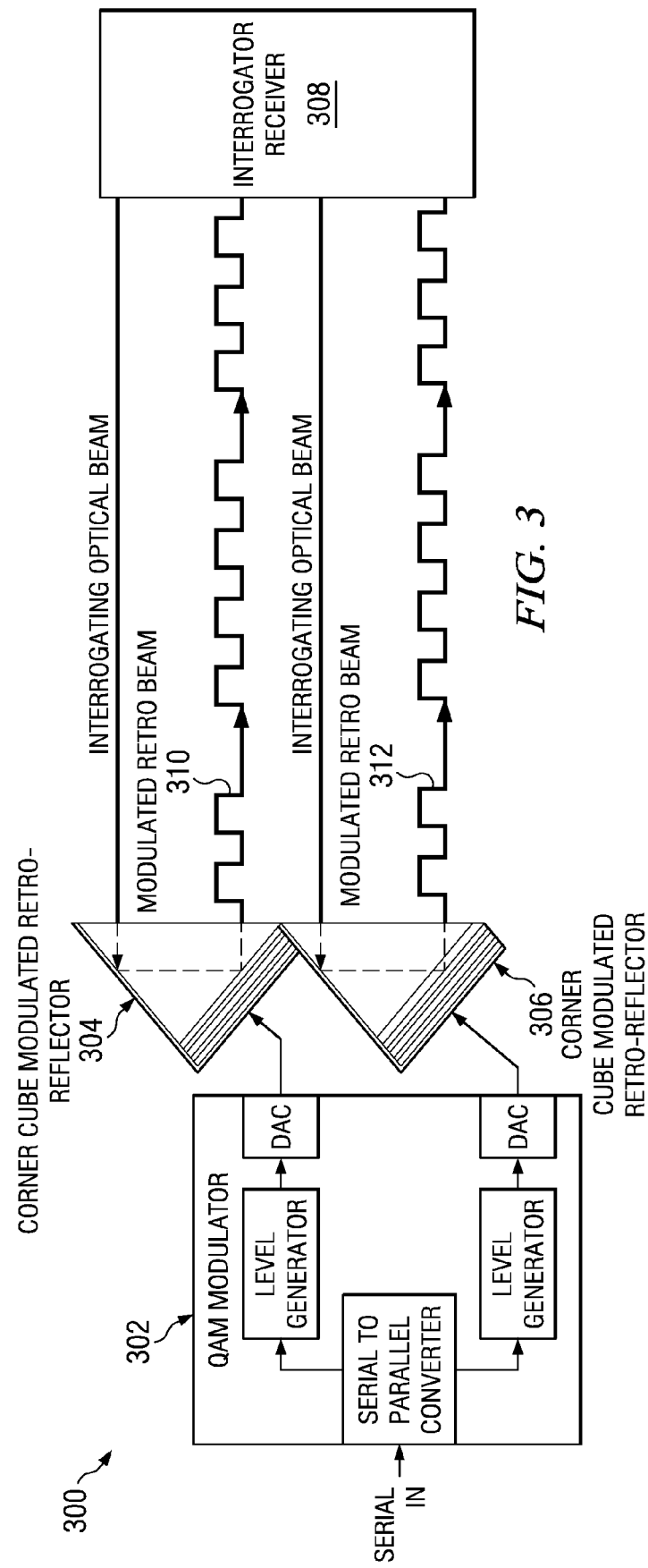
FIG. 3 is a block diagram depicting a system in which advantageous embodiments of the present disclosure may be implemented.

FIG. 3 is a block diagram depicting a system in which advantageous embodiments of the present disclosure may be implemented. System 300 comprises quadrature amplitude modulation (QAM) modulator 302, corner cube modulated retro-reflectors 304 and 306, and interrogator receiver 308. Interrogator receiver 308 sends an interrogating optical beam that illuminates both corner cube modulated retro-reflectors 304 and 306. An interrogating optical beam is an optical beam that illuminates an area and causes the beam to be modified and reflected back to a receiver. An optical detector (not shown) at corner cube modulated retro-reflectors 304 and 306, upon detecting the interrogating optical beam, triggers corner cube modulated retro-reflectors 304 and 306 to initiate data transmission.

In an alternative advantageous embodiment, corner cube modulated retro-reflectors 304 and 306 operate in a free running data transmission mode, modulating with real data or idle data. In a passive, transmission-off state, corner cube modulated retro-reflectors 304 and 306 simply reflect back to the interrogator receiver nearly the entire energy that is incident upon corner cube modulated retro-reflectors 304 and 306. In a transmission-on state, corner cube modulated retro-reflectors 304 and 306 modulate the amount of light that is reflected back to interrogator receiver 308, thus encoding data onto the reflected beam. The data is conveyed in the form of a quadrature amplitude modulation (QAM) symbol, which is made up of an I value and a Q value. Corner cube modulated retro-reflectors 304 and 306 each reflect a modulated optical beam, modulated retro beams 310 and 312, back to interrogator receiver 308, which then demodulates the received signals. Quadrature amplitude modulation (QAM) modulator 302 controls the modulation imposed upon the interrogating optical beam by corner cube modulated retro-reflectors 304 and 306.

Advantageous embodiments of the disclosure provide a method of increasing the bandwidth of any modulated optical retro-reflector. Further, advantageous embodiments provide the bandwidth efficiency methodologies of radio frequency (RF) digital communications to modulated optical retro-reflectors. Thus, advantageous embodiments of the present disclosure are able to provide 1 Gbps data rates from a remote air platform, while not relying on precision active pointing and tracking and an on-board laser source.

Prior solutions have provided for modulating modulated optical retro-reflectors by on-off keying (OOK). On-off keying (OOK) is a type of modulation that represents digital data as the presence or absence of a carrier wave, or alternatively, the presence of a carrier wave at two distinct levels. In its simplest form, the presence of a carrier wave for a specific duration represents a binary one, while the absence of the carrier wave for the same duration represents a binary zero. Some more sophisticated schemes vary these durations to convey additional information. Also, many of these solutions require the use of heavy laser terminals that are gimbaled.

However, quadrature amplitude modulation (QAM) provides increased bandwidth over standard on-off keying (OOK) modulation. Quadrature amplitude modulation (QAM) is a modulation scheme which conveys data by changing, or "modulating," the amplitude of two carrier waves. These two waves, usually sinusoids, are out of phase with each other by 90-degrees and are thus called quadrature carriers. Modulating two modulated optical retro-reflectors, one in an I channel and one in a Q channel, allows the present disclosure to achieve N-QAM modulation of the modulated optical retro-reflectors. The amount modulation of the interrogating optical beam in the I channel corresponds to the I value. The amount of modulation of the interrogating optical beam in the Q channel corresponds to the Q value. N-QAM modulation is a digital modulation scheme used to modulate the active carriers where N is typically 16 or 32. Thus, 16-QAM modulation provides four times the bandwidth of simple on-off keying (OOK) modulation of modulated optical retro-reflectors.

In digital communications, a symbol is the smallest unit of data transmitted at one time. In the simplest modulation schemes, such as on-off keying (OOK) for example, only one bit of data, or "symbol," is transmitted at a time. An example of a bit of data or a symbol is a 0 or 1. However, more complex modulation schemes, such as N-QAM allow for more data to be sent at a time. For example, in 16-QAM, four bits of data, each symbol consists of four bits, are transmitted in one time period, resulting in a symbol rate, or baud rate, that is equal to one quarter of the bit rate. In this example, the bit is four (4) bits per second.

A constellation diagram is a representation of a signal modulated by a digital modulation scheme such as quadrature amplitude modulation (QAM). A constellation diagram displays the signal as a two-dimensional distribution of I and Q plotted in the complex plane. In a more abstract sense, the constellation diagram represents all the possible symbols that may be selected in a given modulation scheme as points in the complex plane. Measured constellation diagrams, plots of measured I and Q, can be used to recognize the type of interference and distortion in a signal.

By representing a transmitted symbol as a complex number and modulating a cosine and sine carrier signal with the real and imaginary parts, respectively, the symbol can be sent with two carriers on the same frequency, which are quadrature carriers. A coherent detector is able to independently demodulate these carriers.

As the symbols are represented as complex numbers, they can be visualized as points on the complex plane. The real and imaginary axes are often called the in phase, or I-axis, and the quadrature, or Q-axis. Plotting several symbols in a two-dimensional (2D) diagram produces the constellation diagram. The points on a constellation diagram are called constellation points.

Upon receipt of a signal, a demodulator examines the received symbol, which may have been corrupted by the channel or the receiver, such as, for example, by additive white Gaussian noise, distortion, phase noise, or interference. The demodulator selects, as the demodulator's estimate of what was actually transmitted, the point on the constellation diagram that is closest, in a Euclidean distance sense, to that of the received symbol. Thus, the demodulator can demodulate incorrectly if corruption has caused the received symbol to move closer to another constellation point than the constellation point that was actually transmitted.

Figure 4:
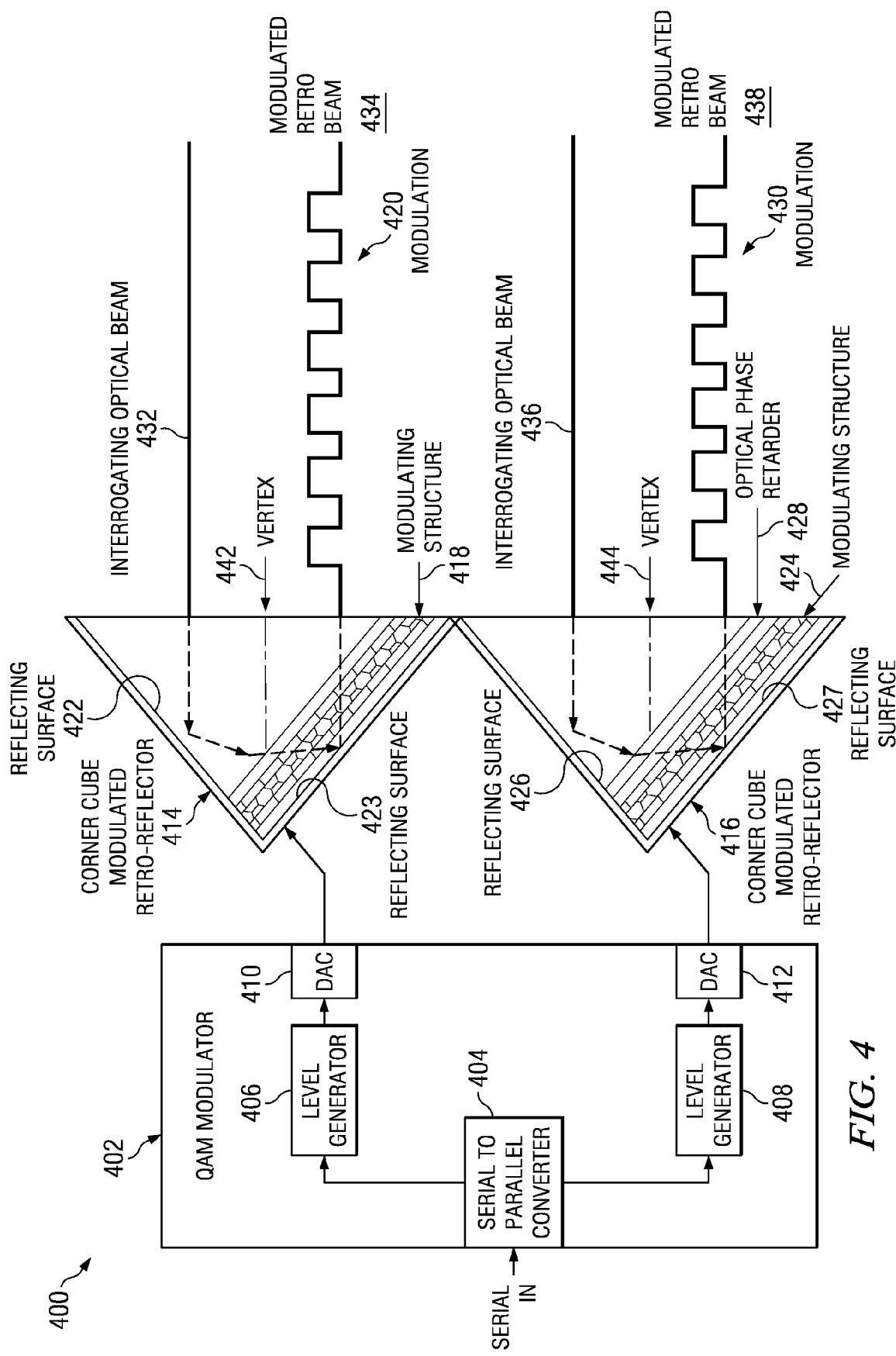
FIG. 4 is block diagram of a system for implementing quadrature amplitude modulation (QAM) for modulated optical retro-reflectors (QAMMRR) in accordance with an advantageous embodiment.

Turning back to the figures, FIG. 4 is block diagram of a system for implementing quadrature amplitude modulation for modulated optical retro-reflectors (QAMMRR) in accordance with an advantageous embodiment. System 400 comprises quadrature amplitude modulation (QAM) modulator 402 and corner cube modulated retro-reflectors 414 and 416. A corner cube modulated retro-reflector has three orthogonal reflecting surfaces, such as mirrors. Quadrature amplitude modulation (QAM) modulator 402 comprises serial to parallel converter 404, two amplitude level generators, level generators 406 and 408, and two digital to analog converters, DAC 410 and 412.

The reflecting surfaces of a corner cube retro-reflector reflect a light about the optical axis, or vertex, of the corner cube retro-reflector. Corner cube modulated retro-reflector 414 comprises reflecting surfaces 422 and 423 and modulating structure 418. Reflecting surfaces 422 and 423 reflect a received optical beam about a vertex. Modulating structure 418 introduces a modulation into the received optical beam. Corner cube modulated retro-reflector 416 comprises reflecting surfaces 426 and 427, modulating structure 424, and optical phase retarder 428. Reflecting surfaces 426 and 427 reflect a received optical beam about a vertex. Modulating structure 424 introduces a modulation into the received optical beam. Optical phase retarder 428 introduces a ninety-degree (90°) phase shift into the reflected optical beam with respect to corner cube modulated retro-reflector 416.

Quadrature amplitude modulation (QAM) modulator 402 receives a serial signal in serial to parallel converter 404. Serial to parallel converter 404 converts the received serial signal into two parallel signals, the I channel signal and the Q channel signal. The I channel signal causes an amount of modulation corresponding to the I value to be generated by a modulated optical retro-reflector and applied to an interrogating optical beam, forming a modulated retro beam. The Q channel signal causes an amount of modulation corresponding to the Q value to be generated by a modulated optical retro-reflector and applied to an interrogating optical beam, forming a modulated retro beam.

One signal is sent to level generator 406, and the second signal is sent to level generator 408. Level generator 406 outputs a signal to DAC 410, which converts the signal and sends the signal as an input to corner cube modulated retro-reflector 414. The signal is received as input to modulating structure 418. The signal controls the amount of modulation 420 created by modulating structure 418. Level generator 408 outputs a signal to DAC 412, which converts the signal and sends the signal as input to corner cube modulated retro-reflector 416. The signal is received as input to modulating structure 424. The signal controls the amount of modulation 430 created by modulating structure 424.

In an alternate advantageous embodiment, each output from quadrature amplitude modulation (QAM) modulator 402 drives a plurality of corner cube modulated retro-reflectors in either the I or Q channel. Each corner cube modulated retro-reflector in the plurality of corner cube modulated retro-reflectors is offset by a specific phase. Thus, a scalable plurality of corner cube modulated retro-reflectors can be driven by one quadrature amplitude modulation (QAM) modulator.

Corner cube modulated retro-reflectors 414 and 416 are two adjacent, co-boresighted modulated retro-reflectors. Co-boresighted means the central optical axis of the two retro-reflectors are aligned to be exactly parallel, within instrument tolerance, or that the central optical axis of the two retro-reflectors intersects at a precisely known point. Corner cube modulated retro-reflector 416 has an optical phase retarder 428 that provides a ninety-degree (90°) phase shift of corner cube modulated retro-reflector 416 with respect to corner cube modulated retro-reflector 414, which is otherwise an optically identical, modulated retro-reflector.

An assembly of modulated optical retro-reflectors, such as the pair of corner cube modulated retro-reflectors 414 and 416, are designed so that their aggregate angular diameter is entirely contained within the angular Field of View (FOV) of the interrogator receiver's optics, and the aggregate linear diameter is also smaller than the spot size of the interrogating optical beam at the modulated optical retro-reflectors.

An aggregate diameter is the sum total of all the diameters involved. Thus, in the present advantageous embodiment, the aggregate angular diameter refers to the sum of the angular diameters of each of the corner cube modulated retro-reflectors and the aggregate linear diameter is the sum total of the linear diameters of the corner cube modulated retro-reflectors. A spot size is the width of a beam. Thus, the spot size of the interrogating optical beam is the width of the interrogating optical beam. The angular Field of View is the extent of the observable world that is seen at any given moment through a given angle.

Thus, when corner cube modulated retro-reflector 414 receives an input interrogating optical beam 432, reflecting surface 422 reflects interrogating optical beam 432 about vertex 442 through modulating structure 418 onto reflecting surface 423, which reflects interrogating optical beam 432 through modulating structure 418, and back to an interrogator receiver (not shown) as modulated retro beam 434. Modulating structure 418 introduces modulation 420 into interrogating optical beam 432, forming modulated retro beam 434. The amount of modulation 420 generated by modulating structure 418 is driven by a signal received from quadrature amplitude modulation (QAM) modulator 402. Modulation 420 is an amount of modulation in either an I channel or a Q channel. The amount of modulation 420 in either the I channel or Q channel corresponds to either an I value or a Q value, respectively, of the data being transmitted. Modulating structure 418 is overlaid, which is referred to as embedded, on reflecting surface 423.

Similarly, when corner cube modulated retro-reflector 416 receives an input interrogating optical beam 436, reflecting surface 426 reflects interrogating optical beam 436 about vertex 444 through modulating structure 424 and optical phase retarder 428 onto reflecting surface 427, which reflects interrogating optical beam 436 back through modulating structure 424, and optical phase retarder 428, and back to an interrogator receiver (not shown) as modulated retro beam 438. Modulating structure 424 introduces modulation 430 into interrogating optical beam 436, forming modulated retro beam 438. Optical phase retarder 428 introduces a ninety-degree (90°) phase shift into modulated retro beam 438 with respect to modulated retro beam 434. The amount of modulation 430 generated by modulating structure 424 is driven by a signal received from quadrature amplitude modulation (QAM) modulator 402. Modulation 430 is an amount of modulation in either an I channel or a Q channel. The amount of modulation 430 in either the I channel or Q channel corresponds to either an I value or a Q value, respectively, of the data being transmitted. Modulating structure 424 and optical phase retarder 428 are overlaid, which is referred to as embedded, on reflecting surface 427.

The ninety-degree (90°) phase shift may be applied to either the I or Q channel. Which channel, the I or Q channel, is phase shifted is not relevant, as shifting one channel provides no specific benefit over phase shifting the other channel.

Phasing shifting either the I or Q channel allows the interrogator beam to be modulated in both I and Q channels by physically separating the I and Q channels within the Field of View (FOV) of the interrogator receiver's optics. This way, the returns from the two corner cube modulated retro-reflectors may be collected by an interrogator receiver as a single, combined field. A Coherence quadrature amplitude modulation (QAM) Receiver and demodulator at the interrogator decomposes the beam into the I and Q channels, and recovers the quadrature amplitude modulation (QAM) symbols, which are then converted into a bit stream by the quadrature amplitude modulation (QAM) modem. Alternative embodiments include placing the optical phase retarder at different locations depending on the modulated optical retro-reflector architecture. Alternative embodiments exist for phase shift keying as well, with modulating structures designed for phase shift keying, or other bandwidth efficient modulation techniques.

Figure 5:
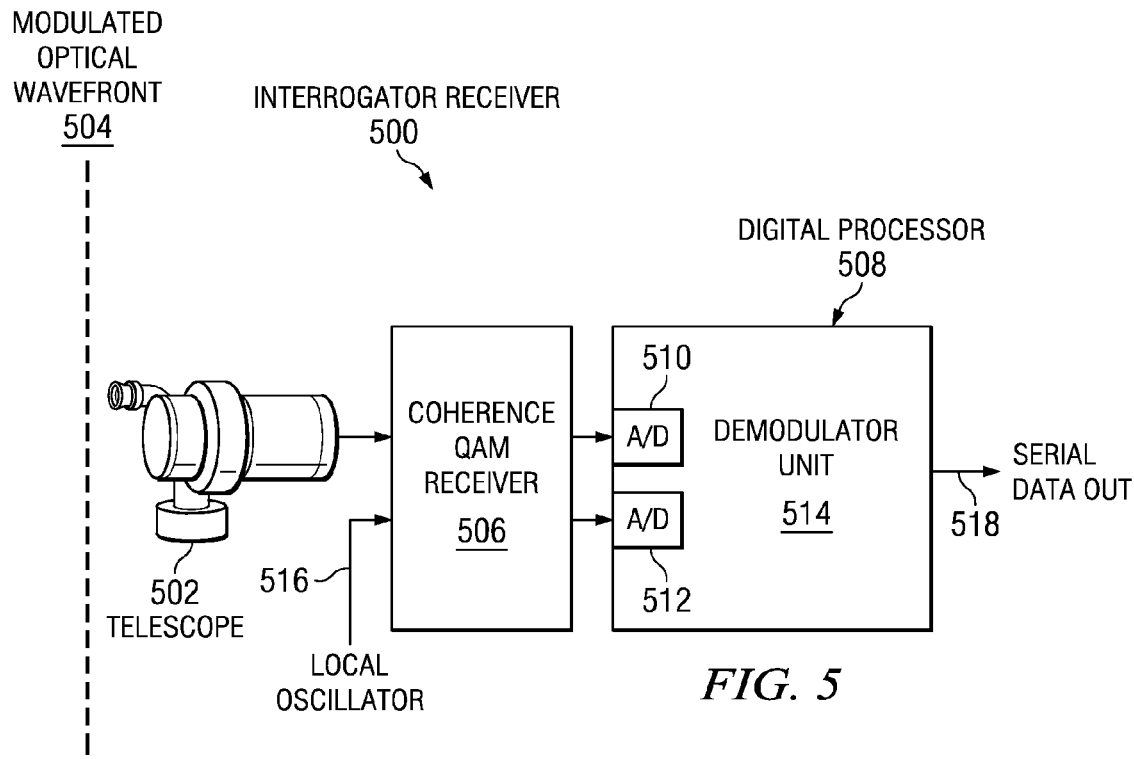
FIG. 5 is a diagram of an interrogator receiver in accordance with an advantageous embodiment.

FIG. 5 is a diagram of an interrogator receiver in accordance with an advantageous embodiment. Interrogator receiver 500 comprises telescope 502, coherence quadrature amplitude modulation (QAM) receiver 506, and digital processor 508. Digital processor 508 comprises analog to digital converters A/D 510 and 512 and demodulator unit 514. Telescope 502 receives modulated optical wavefront 504. Modulated optical wavefront 504 comprises two modulated optical beams, one optical beam modulated in the I channel and the other optical beam modulated in the Q channel. The two modulated optical beams are ninety-degrees (90°) out of phase with each other. The received modulated optical wavefront 504 is then input into coherence quadrature amplitude modulation (QAM) receiver 506 along with local oscillator 516. Coherence quadrature amplitude modulation (QAM) receiver 506 decomposes modulated optical wavefront 504 into the I and Q signals, sending one signal to analog to digital converter A/D 512 of digital processor 508 and the other signal to analog to digital converter A/D 510 of digital processor 508. Analog to digital converters A/D 510 and 512 digitize the received I and Q quadrature amplitude modulation (QAM) signals from coherence quadrature amplitude modulation (QAM) receiver 506 and pass the signals to demodulator unit 514. Demodulator unit 514 decodes the digital I and Q signal levels to assign the bit map to the (I, Q) pairs. The bits that map to the incoming (I, Q) constellation points are then serialized and sent 518 into the communications data stream and ultimately the data recipient. Demodulator unit 514 may be programmed to filter out distortions in the signals resulting from a Doppler Effect, tilting, modulator and demodulator nonlinearities, and atmospheric turbulence.

Figure 6:
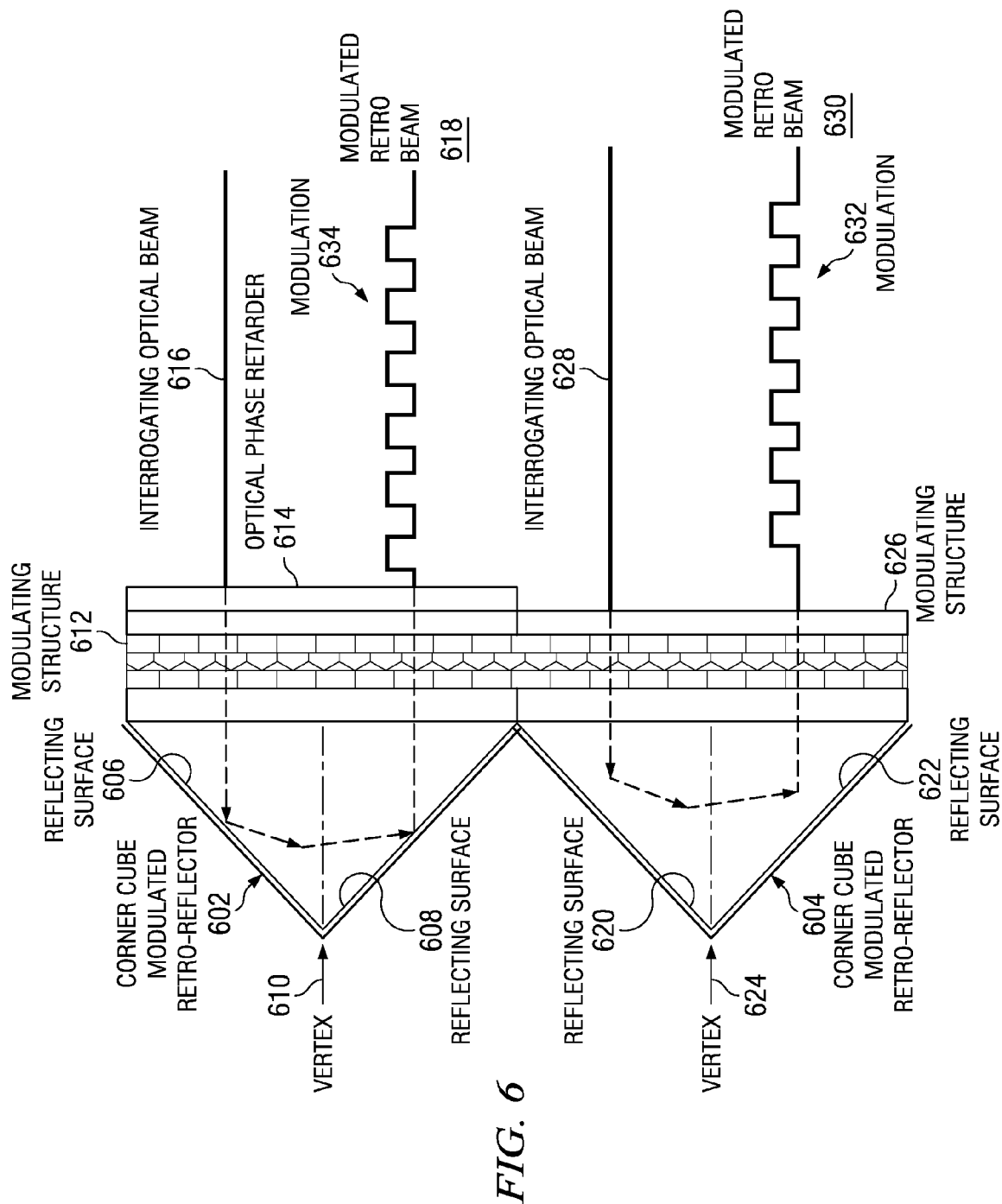
FIG. 6 is a block diagram of an alternate advantageous embodiment of a pair of corner cube modulated retro-reflectors in accordance with an advantageous embodiment.

FIG. 6 is a block diagram of an alternate advantageous embodiment of a pair of corner cube modulated retro-reflectors in accordance with an advantageous embodiment. Corner cube modulated retro reflector 602 comprises three orthogonal reflecting surfaces, two of which, reflecting surfaces 606 and 608, are shown, modulating structure 612 and optical phase retarder 614. Corner cube modulated retro-reflector is an alternate embodiment of corner cube modulated retro-reflector 416 in FIG. 4. In corner cube modulated retro-reflector 602, instead of the modulating structure and optical phase retarder being overlaid on a reflecting surface, the modulating structure and optical phase retarder are overlaid across the aperture of corner cube modulated retro-reflector 602. Otherwise, corner cube modulated retro-reflector 602 is the same as corner cube modulated retro-reflector 416 in FIG. 4.

Similarly, corner cube modulated retro reflector 604 comprises three orthogonal reflecting surfaces, two of which, reflecting surfaces 620 and 622, are shown, and modulating structure 626. Corner cube modulated retro-reflector is an alternate embodiment of corner cube modulated retro-reflector 414 in FIG. 4. In corner cube modulated retro-reflector 604, instead of the modulating structure being overlaid on a reflecting surface, the modulating structure is overlaid across the aperture of corner cube modulated retro-reflector 604. Otherwise, corner cube modulated retro-reflector 604 is the same as corner cube modulated retro-reflector 414 in FIG. 4.

Thus, when corner cube modulated retro-reflector 602 receives input interrogating optical beam 616, interrogating optical beam 616 passes through optical phase retarder 614 and modulating structure 612 to reflecting surface 606. Reflecting surface 606 reflects interrogating optical beam 616 about vertex 610 onto reflecting surface 608, which reflects interrogating optical beam 616 back through modulating structure 612 and optical phase retarder 614 and back to an interrogator receiver (not shown) as modulated retro beam 618. Modulating structure 612 introduces modulation 634 into interrogating optical beam 616, forming modulated retro beam 618.

Similarly, when corner cube modulated retro-reflector 604 receives input interrogating optical beam 628, interrogating optical beam 628 passes through modulating structure 626 to reflecting surface 620. Reflecting surface 620 reflects interrogating optical beam 628 about vertex 624 onto reflecting surface 622, which reflects interrogating optical beam 628 back through modulating structure 626, and back to an interrogator receiver (not shown) as modulated retro beam 630. Modulating structure 626 introduces modulation 632 into interrogating optical beam 628, forming modulated retro beam 630.

It should be understood that while examples of advantageous embodiments in the present disclosure have been described in terms of a corner cube modulated retro-reflector, the use of a corner cube retro-reflector is not intended to imply any architectural limit on the advantageous embodiments. Rather, a corner cube modulated retro-reflector is merely one example on a type of modulated optical retro-reflector that may be used in advantageous embodiments. Any type of modulated optical retro-reflector may be used in various advantageous embodiments, including, for example, but not limited to, cat's eye retro-reflectors.

Figure 7:
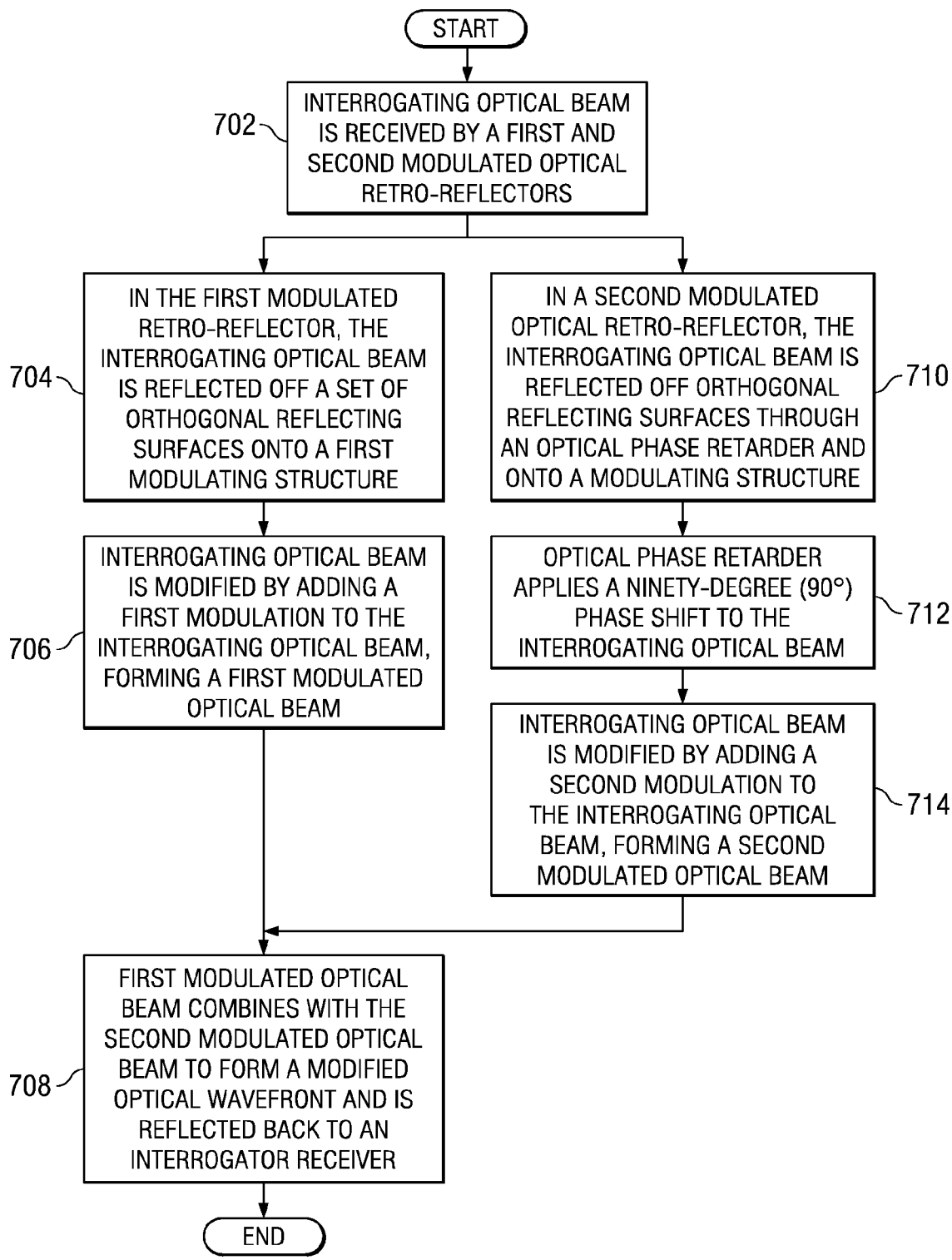
FIG. 7 is a flowchart of the operation of applying quadrature amplitude modulation (QAM) to modulated optical retro-reflectors in accordance with an advantageous embodiment.

FIG. 7 is a flowchart of the operation of applying quadrature amplitude modulation (QAM) to modulated optical retro-reflectors in accordance with an advantageous embodiment. The operation of FIG. 7 may be performed by a pair of adjacent, co-boresighted modulated optical retro-reflectors, such as corner cube modulated retro-reflectors 414 and 416 in FIG. 4. The operation begins when an interrogating optical beam is received by a first and second modulated optical retro-reflectors, wherein the first and second modulated optical retro-reflectors are adjacent to each other and co-boresighted, wherein the aggregate angular diameter of the first and second modulated optical retro-reflectors is contained within the angular Field of View (FOV) of an optic of an interrogator receiver, and wherein the aggregate linear diameter of the first and second modulated optical retro-reflectors is also smaller than the spot size of the interrogating optical beam at the modulated optical retro-reflectors (operation 702).

In the first modulated retro-reflector, the interrogating optical beam is reflected off a set of orthogonal reflecting surfaces, such as mirrors, for example, onto a first modulating structure (operation 704). The interrogating optical beam is modified by adding a first modulation to the interrogating optical beam, forming a first modulated optical beam, wherein the first modulation is added to the interrogating optical beam by the first modulated optical retro-reflector, and wherein the first modulation corresponds to an I value of an I symbol of a quadrature amplitude modulation (QAM) symbol for a piece of data (operation 706). The first modulated optical beam combines with the second modulated optical beam to form a modified optical wavefront and is reflected back to an interrogator receiver (operation 708) and the operation ends.

Simultaneously, in a second modulated optical retro-reflector, the interrogating optical beam is reflected off orthogonal reflecting surfaces, such as mirrors, for example, through an optical phase retarder and onto a modulating structure (operation 710). The optical phase retarder applies a ninety-degree (90°) phase shift to the interrogating optical beam (operation 712). The interrogating optical beam is modified by adding a second modulation to the interrogating optical beam, forming a second modulated optical beam, wherein the second modulation is added to the interrogating optical beam by the second modulated optical retro-reflector, and wherein the second modulation corresponds to a Q value of a Q symbol of the quadrature amplitude modulation (QAM) symbol for the piece of data (operation 714). The first modulated optical beam combines with the second modulated optical beam to form a modified optical wavefront and is reflected back to an interrogator receiver (operation 708) and the operation ends.

A quadrature amplitude modulation (QAM) modulator drives the modulating structure in each of the pair of adjacent, co-boresighted, corner cube modulated retro-reflectors. One output from the quadrature amplitude modulation (QAM) modulator drives one corner cube modulated retro-reflector to modulate in the Q channel. The second output from the quadrature amplitude modulation (QAM) modulator drives one corner cube modulated retro-reflector to modulate in the I channel. In an alternate embodiment, each output from the quadrature amplitude modulation (QAM) modulator drives a plurality of corner cube modulated retro-reflectors in either the Q or I channel. Each corner cube modulated retro-reflector in the plurality of corner cube modulated retro-reflectors is offset by a specific phase.

Figure 8:
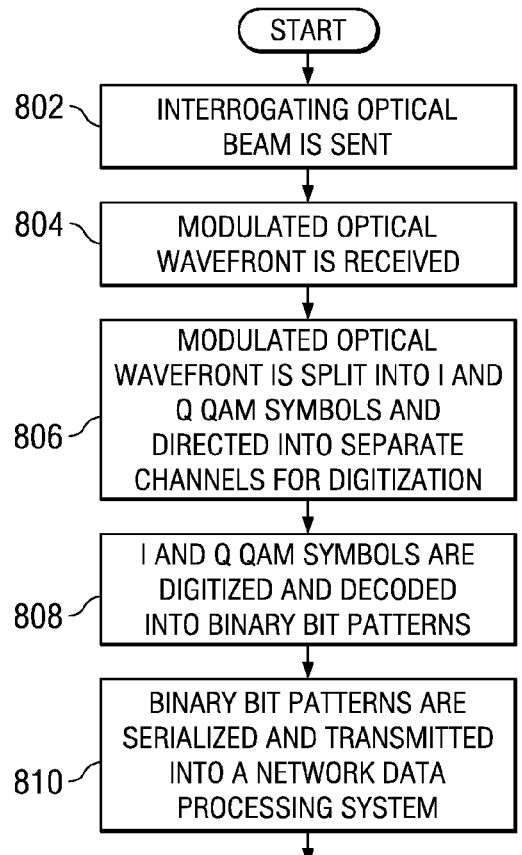
FIG. 8 is a flowchart illustrating the operation of an interrogator receiver in accordance with an advantageous embodiment.

FIG. 8 is a flowchart illustrating the operation of an interrogator receiver in accordance with an advantageous embodiment. The operation of FIG. 8 may be performed by an interrogator receiver, such as interrogator receiver 308 in FIG. 3. The operation begins when an interrogating optical beam is sent (operation 802). A modulated optical wavefront is received (operation 804). The modulated optical wavefront is split into I and Q quadrature amplitude modulation (QAM) symbols and directed into separate channels for digitization (operation 806). The I and Q quadrature amplitude modulation (QAM) symbols are digitized and decoded into binary bit patterns (operation 808). The binary bit patterns are serialized and transmitted into a network data processing system (operation 810), and the operation ends.

Thus, exemplary embodiments of the present disclosure provide for point-to-point communication over an optical channel. Exemplary embodiments of the present disclosure increase the bandwidth of any modulated optical retro-reflector architecture by: adding additional adjacent, co-boresighted, modulated optical retro-reflectors with an embedded MQW device; adding a ninety-degree (90°) optical phase shift on one modulated optical retro-reflector with respect to the other modulated optical retro-reflector; modulating all the modulated optical retro-reflectors in the I and Q channels to achieve N-QAM modulation; demodulating the quadrature amplitude modulation (QAM) signal at the receiver; and utilizing adaptive compensation algorithms to mitigate distortion of the constellation diagram due to tilts, Doppler Effect, atmospheric turbulence, and so forth.

Thus, bandwidth is increased without extending the physical properties of the solid-state modulators, with a smaller footprint than prior gimbaled solutions. While the present disclosure may be used in a variety of mediums, from airborne aircraft, to ground vehicles, to waterborne vessels, exemplary embodiments of the present disclosure provide particular advantages for unmanned aerial vehicles and other vehicles and platforms with limited space for communication devices.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for point-to-point communication over an optical channel, the system comprising:
   a first modulated optical retro-reflector;
   a second modulated optical retro-reflector, wherein both the first and second modulated optical retro-reflectors are adjacent to each other and co-boresighted, and wherein an aggregate angular diameter of the first and second modulated optical retro-reflectors is contained within an angular Field of View (FOV) of an optic of an interrogator receiver, and wherein an aggregate linear diameter of the first and second modulated optical retro-reflectors is smaller than a spot size of an interrogating optical beam at the first and second modulated optical retro-reflectors; and
   a quadrature amplitude modulation (QAM) modulator unit coupled to both the first and second modulated optical retro-reflectors, wherein the quadrature amplitude modulation (QAM) modulator unit drives an amount of modulation generated by a first modulating structure in the first modulated optical retro-reflector and a second modulating structure in the second modulated optical retro-reflector, wherein the amount of modulation in the first modulated optical retro-reflector corresponds to an I value of an I symbol of a quadrature amplitude modulation (QAM) symbol for a piece of data and wherein the amount of modulation in the second modulated optical retro-reflector corresponds to a Q value of a Q symbol of the quadrature amplitude modulation (QAM) symbol for the piece of data.

2. The system of claim 1, the first modulated optical retro-reflector, wherein the first modulated optical retro-reflector comprises:
   a set of three orthogonal reflecting surfaces, wherein the reflecting surfaces receive the interrogating optical beam and reflect the interrogating optical beam onto the modulating structure; and
   a modulating structure, wherein the modulating structure overlays one of the three orthogonal reflecting surfaces of the first modulated optical retro-reflector, and wherein the modulating structure receives the interrogating optical beam reflected from the reflecting surfaces, modifies the interrogating optical beam by adding a first modulation to the interrogating optical beam to form a first modulated optical beam, and passes the first modulated beam to the reflecting surfaces for reflection of the first modulated optical beam to the interrogator receiver;
   the second modulated optical retro-reflector, wherein the second modulated optical retro-reflector comprises:
      a set of three orthogonal reflecting surfaces, wherein the reflecting surfaces receive the interrogating optical beam at the same time as the first modulated optical retro-reflector and reflect the interrogating optical beam through an optical phase retarder onto the modulating structure;
      an optical phase retarder, wherein the optical phase retarder applies a ninety-degree phase shift to the interrogating optical beam;
      a modulating structure coupled to the optical phase retarder, wherein the modulating structure and the optical phase retarder overlay one of the three orthogonal reflecting surfaces of second modulated optical retro-reflector, and wherein the modulating structure receives the interrogating optical beam, modifies the interrogating optical beam by adding a second modulation to the interrogating optical beam to form a second modulated optical beam, and passes the second modulated beam to the reflecting surfaces for reflection of the second modulated optical beam to the interrogator receiver; and
   wherein the first modulated optical beam and the second modulated optical beam combine to form a modulated optical wavefront.

3. The system of claim 1, the quadrature amplitude modulation (QAM) modulator unit comprising:
   a serial to parallel converter;
   a first amplitude level generator coupled to the serial to parallel converter;
   a second amplitude level generator coupled to the serial to parallel converter;
   a first digital to analog converter coupled to the first amplitude level generator and coupled to the first modulated optical retro-reflector; and
   a second digital to analog converter coupled to the second amplitude level generator and coupled to the second modulated optical retro-reflector.

4. The system of claim 3, the quadrature amplitude modulation (QAM) modulator unit further comprising:
   the quadrature amplitude modulation (QAM) modulator, wherein the quadrature amplitude modulation (QAM) modulator unit drives the modulating structure of the first modulated optical retro-reflector to generate a modulation in a Q channel and driving the modulating structure of the second modulated optical retro-reflector to generate a modulation in an I channel.

5. The system of claim 3, further comprising:
   a first plurality of modulated optical retro-reflectors, wherein each modulated optical retro-reflector in the first plurality of modulated optical retro-reflectors is offset by a specific phase and wherein the first digital to analog converter coupled to the first amplitude level generator is coupled to the first plurality of modulated optical retro-reflectors;
   a second plurality of modulated optical retro-reflectors, wherein each modulated optical retro-reflector in the second plurality of modulated optical retro-reflectors is offset by a specific phase and wherein the second digital to analog converter coupled to the second amplitude level generator is coupled to the second plurality of modulated optical retro-reflectors; and
   the quadrature amplitude modulation (QAM) modulator, wherein the quadrature amplitude modulation (QAM) modulator unit drives the modulating structure of each of the modulated optical retro-reflector in the first plurality of modulated optical retro-reflectors to generate a modulation in the Q channel; and wherein the quadrature amplitude modulation (QAM) modulator unit drives the modulating structure of each of the modulated optical retro-reflector of the second plurality of modulated optical retro-reflectors to generate a modulation in the I channel.

6. The system of claim 1, further comprising:
   an interrogator receiver, wherein the interrogator receiver is formed to transmit an interrogating optical beam to both the first and second modulated optical retro-reflectors and to receive and demodulate the modulated optical wavefront.

7. The system of claim 6, the interrogator receiver comprising:
the interrogator receiver wherein the interrogator receiver is formed to compensate for interference in the modified optical wavefront.

8. The system of claim 1, further comprising:
an aircraft, wherein the aircraft is coupled to the first modulated optical retro-reflector, the modulated optical retro-reflector, and the quadrature amplitude modulation (QAM) modulator unit.

9. A method for point-to-point communication over an optical channel, the method comprising:
receiving an interrogating optical beam at a first modulated optical retro-reflector;
receiving, simultaneously, the interrogating optical beam at a second modulated optical retro-reflector, wherein the first and second modulated optical retro-reflectors are adjacent to each other and co-boresighted and wherein an aggregate angular diameter of the first and second modulated optical retro-reflectors is contained within an angular Field of View (FOV) of an optic of an interrogator receiver, and wherein an aggregate linear diameter of the first and second modulated optical retro-reflectors is smaller than a spot size of an interrogating optical beam at the first and second modulated optical retro-reflectors;
modifying the interrogating optical beam by adding a first modulation to the interrogating optical beam, forming a first modulated optical beam, wherein the first modulation is added to the interrogating optical beam by the first modulated optical retro-reflector, and wherein the first modulation corresponds to an I value of an I symbol of a quadrature amplitude modulation (QAM) symbol for a piece of data;
modifying, simultaneously, the interrogating optical beam by adding a second modulation to the interrogating optical beam, forming a second modulated optical beam, wherein the second modulation is added to the interrogating optical beam by the second modulated optical retro-reflector, and wherein the second modulation corresponds to a Q value of a Q symbol of the quadrature amplitude modulation (QAM) symbol for the piece of data; and
reflecting the first modulated optical beam and the second modulated optical beam to the interrogator receiver, wherein the first modulated optical beam and the second modulated optical beam combine to form a modified optical wavefront.

10. The method of claim 9 further comprising:
generating the first modulation; and
generating the second modulation.

11. The method of claim 10, further comprising:
controlling generating the first modulation and generating the second modulation by coupling a quadrature amplitude modulation (QAM) modulator unit coupled to the first and second modulated optical retro-reflectors.

12. The method of claim 9, further comprising:
applying a ninety-degree phase shift to the second modulated optical beam.

13. The method of claim 9, the step of modifying the interrogating optical beam by adding a first modulation to the interrogating optical beam to form a first modulated optical beam, wherein the first modulation is added to the interrogating optical beam by the first modulated optical retro-reflector, further comprising:
receiving the interrogating optical beam by a set of reflecting surfaces;
propagating the interrogating optical beam, by the set of reflecting surfaces, onto a first modulating structure, wherein the first modulating structure overlays one of the reflecting surfaces of the set of reflecting surfaces;
adding the first modulation to the interrogating optical beam by the first modulating structure; and
the step of modifying, simultaneously, the interrogating optical beam by adding a second modulation to the interrogating optical beam to form a second modulated optical beam, wherein the second modulation is added to the interrogating optical beam by the second modulated optical retro-reflector, further comprises:
receiving the optical beam by a set of reflecting surfaces;
propagating the interrogating optical beam, by the set of reflecting surfaces, through an optical phase retarder, onto a second modulating structure, wherein the second modulating structure is coupled to the optical phase retarder and wherein the second modulating structure and the optical phase retarder overlay one of the reflecting surfaces of the set of reflecting surfaces; and
adding the second modulation to the interrogating optical beam by the second modulating structure.

14. The method of claim 13, further comprising:
adding ninety-degree phase shift to the second modulated beam by the optical phase retarder.

15. The method of claim 13, further comprising:
controlling the first modulating structure to generate the first modulation in a Q channel; and
controlling the second modulating structure to generate the second modulation in an I channel.

16. The method of claim 15, further comprising:
receiving the modified optical wavefront;
demodulating the modified optical wavefront;
recovering the I symbol and the Q symbol of the quadrature amplitude modulation (QAM) symbols for the piece of data;
converting the quadrature amplitude modulation (QAM) symbols to form converted symbols;
sending the converted symbols to a data processing system; and
storing the converted symbols.

17. The method of claim 16, further comprising:
compensating for interference in the modified optical wavefront.

18. The method of claim 17, the step of compensating for interference in the modified optical wavefront, wherein the interference is due to a Doppler Effect.

19. The method of claim 13, further comprising:
controlling the first modulating structure of each of modulated optical retro-reflectors in a first plurality of modulated optical retro-reflectors to generate the first modulation in a Q channel, wherein each modulated optical retro-reflector in the first plurality of modulated optical retro-reflectors is offset by a specific phase; and
controlling the second modulating structure of each of modulated optical retro-reflectors in a second plurality of modulated optical retro-reflectors to generate the second modulation in an I channel, wherein each modulated optical retro-reflector in the second plurality of modulated optical retro-reflectors is offset by a specific phase.

20. The method of claim 9, further comprising:
compensating for nonlinearities in the first and second modulating structures.

21. A computer program product for point-to-point communication over an optical channel, the computer program product comprising:

a computer readable media;

program code, stored on the computer readable media, for receiving an interrogating optical beam at a first modulated optical retro-reflector;

program code, stored on the computer readable media, for receiving, simultaneously, the interrogating optical beam at a second modulated optical retro-reflector, wherein the first and second modulated optical retro-reflectors are adjacent to each other and co-boresighted and wherein an aggregate angular diameter of the first and second modulated optical retro-reflectors is contained within an angular Field of View (FOV) of an optic of an interrogator receiver, and wherein an aggregate linear diameter of the first and second modulated optical retro-reflectors is smaller than a spot size of an interrogating optical beam at the first and second modulated optical retro-reflectors;

program code, stored on the computer readable media, for modifying the interrogating optical beam by adding a first modulation to the interrogating optical beam, forming a first modulated optical beam, wherein the first modulation is added to the interrogating optical beam by the first modulated optical retro-reflector, and wherein the first modulation corresponds to an I value of an I symbol of a quadrature amplitude modulation (QAM) symbol for a piece of data;

program code, stored on the computer readable media, for modifying, simultaneously, the interrogating optical beam by adding a second modulation to the interrogating optical beam, forming a second modulated optical beam, wherein the second modulation is added to the interrogating optical beam by the second modulated optical retro-reflector, and wherein the second modulation corresponds to a Q value of a Q symbol of the quadrature amplitude modulation (QAM) symbol for the piece of data; and program code, stored on the computer readable media, for reflecting the first modulated optical beam and the second modulated optical beam to the interrogator receiver, wherein the first modulated optical beam and the second modulated optical beam combine to form a modified optical wavefront.

\* \* \* \* \*